United States Patent
Ikeya

Patent Number: 5,742,567
Date of Patent: Apr. 21, 1998

[54] MASTER OPTICAL DISK RECORDING APPARATUS

[75] Inventor: Tomoyoshi Ikeya, Yamanashi, Japan

[73] Assignees: Pioneer Electronic Corporation, Tokyo; Pioneer Video Corporation, Yamanashi, both of Japan

[21] Appl. No.: 705,854

[22] Filed: Aug. 28, 1996

[30] Foreign Application Priority Data

Sep. 7, 1995  [JP]  Japan .................................. 7-255670

[51] Int. Cl.⁶ .................................. G11B 13/00
[52] U.S. Cl. .................................. 369/14; 369/16
[58] Field of Search .................. 369/14, 15, 116, 369/124, 112, 114, 117, 119, 61, 62

[56] References Cited

U.S. PATENT DOCUMENTS

| | | | |
|---|---|---|---|
| 5,120,136 | 6/1992 | Oakley | 369/97 |
| 5,278,816 | 1/1994 | Russell | 369/100 |
| 5,523,996 | 6/1996 | Kubota et al. | 369/124 |
| 5,544,133 | 8/1996 | Sin | 369/14 |

*Primary Examiner*—Tan Dinh
*Attorney, Agent, or Firm*—Morgan, Lewis & Bockius LLP

[57] ABSTRACT

A master optical disk recording apparatus forms a train of pits on a recording layer of a master optical disk by a laser beam which is emitted from the laser light source and is modulated by an acousto-optic modulator. An objective lens in the recording apparatus consists of a finite conjugate type lens and a convergence point on the acousto-optic modulation element where the laser beam is converged by a convergence lens is positioned outside of the focal point of the objective lens at the incidence side thereof.

2 Claims, 3 Drawing Sheets

MASTER OPTICAL DISK RECORDING APPARATUS

BACKGROUND OF THE INVENTION

1. Field of the Invention

The present invention relates to an apparatus for recording information onto a master optical disk.

2. Description of the Related Art

FIG. 1 shows a conventional recording apparatus for a master optical disk.

The conventional optical disk recording apparatus includes two optical systems which are a fixed optical system 10 and a moving optical system 20, and a motor 31 to drive a master optical disk 30 which is clamped by a clamper (not shown) on a turntable 31a connected to a rotational shaft of a motor 31.

The fixed optical system 10 includes a source of laser light 11 consisting of a gas laser, e.g. an Ar Gas laser. In the fixed optical system 10, a coherent laser beam emitted from the source of laser light 11 is reflected by a mirror 12 and is supplied to a convergence lens 13. The laser beam is converged or focused at a modulation element (not shown) consisting of a piezo electric material in an acousto-optic (A/O) modulator 14. A drive voltage for ultra-sonic waves carrying thereon an information signal to he recorded is supplied from a driving circuit 15 to the modulation element of the acousto-optic modulator 14, and the acousto-optic modulator 14 modulates the incident beam. The modulated laser beam is transformed into a collimated beam by a collimator lens 16, is reflected by a mirror 17 and is supplied to the moving optical system 20. In the acousto-optic modulator 14, a periodic compression wave appears in the modulation element in response to the drive voltage supplied thereto. By the variations in medium density in the modulation element resulting from the compression wave, the refractive index of the modulation element is varied, so that the modulation element of acousto-optic modulator 14 diffracts the laser beam. The laser beam modulated by the acousto-optic modulator 14 is controlled in its intensity at time intervals in accordance with the modulating signal.

The diameter of the laser beam supplied to the moving optical system 20 is transformed by a concave lens 21 and a collimator lens 22. The laser beam is reflected by a mirror 23, and is supplied to an infinite conjugate type, or I-O infinite system type, objective lens 24, the transformation above-mentioned is required for optimizing the beam diameter for incidence to the lens 24. The laser beam is converged to a specific spot at a predetermined diameter by the objective lens 24 and is irradiated onto a photoresist layer 32 coated on a glass substrate of the master optical disk 30.

Through the sequence described above, the information signal is recorded to the master optical disk 30.

SUMMARY OF THE INVENTION

It is an object of the invention to provide a master optical disk recording apparatus which consists of an optical system combined a fixed optical system and a moving optical system, and which is small in size and simple in construction.

A master optical disk recording apparatus comprises a laser light source, rotating means for rotating a master optical disk to record an information signal, an acousto-optic modulator which modulates an incident beam thereinto in response to the information, a convergence lens system which converges a laser beam emitted from the laser light source to the acousto-optic modulator, and an objective lens which converges the modulated laser beam emitted from the acousto-optic modulator and which irradiates the master optical disk with the modulated laser beam. The objective lens consists of a finite conjugate type, or I-O finite system type, lens, and a convergence point where the laser beam is converged by the convergence lens system is positioned outside of the focal point of the objective lens at the incident-side thereof.

DETAILED DESCRIPTION OF THE PREFFERED EMBODIMENTS

Figure 1:
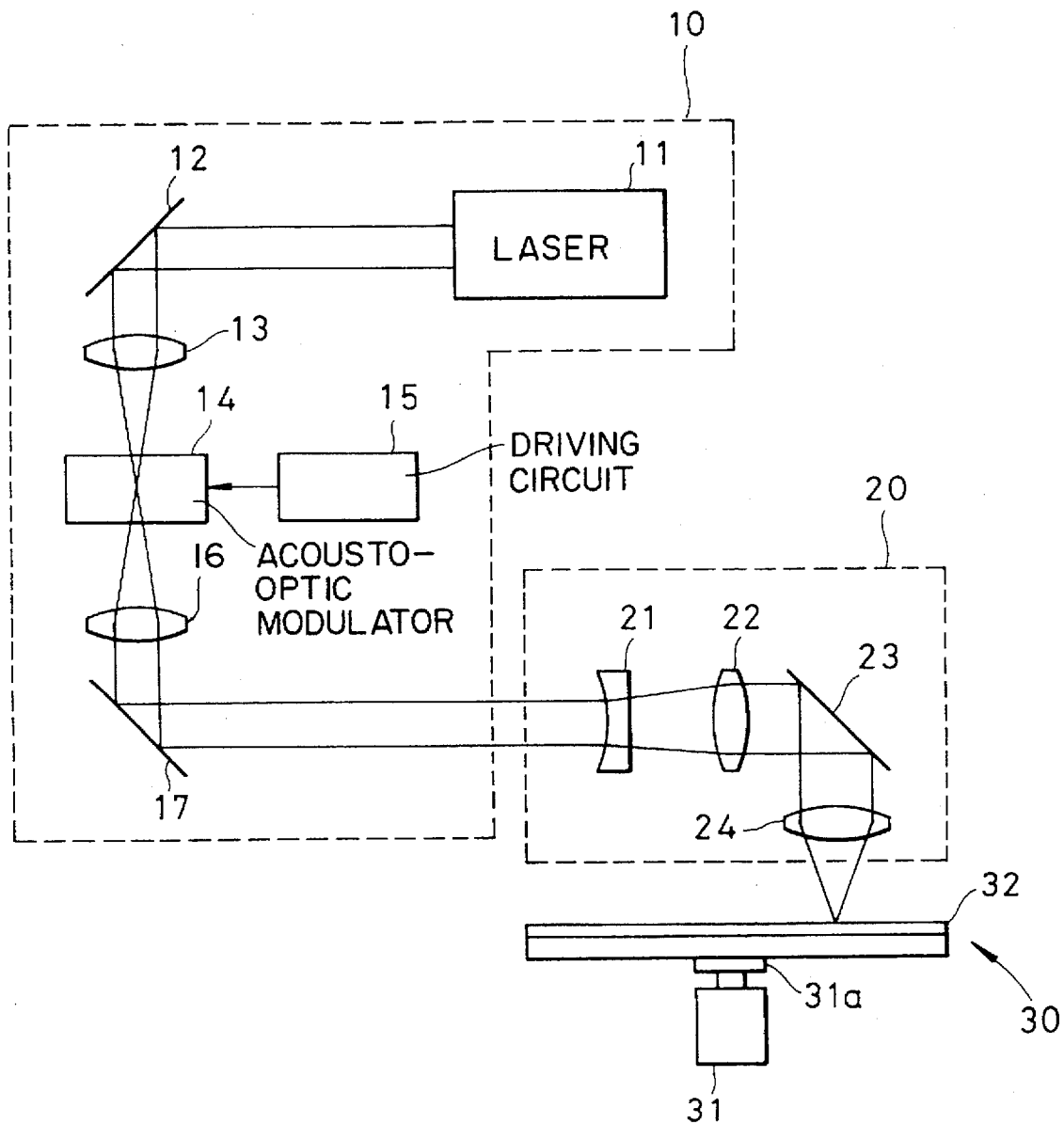
FIG. 1 is a block diagram showing a conventional master optical disk recording apparatus.

In the followings, the embodiments of the present invention will be explained while referring to the drawings.

Figure 2:
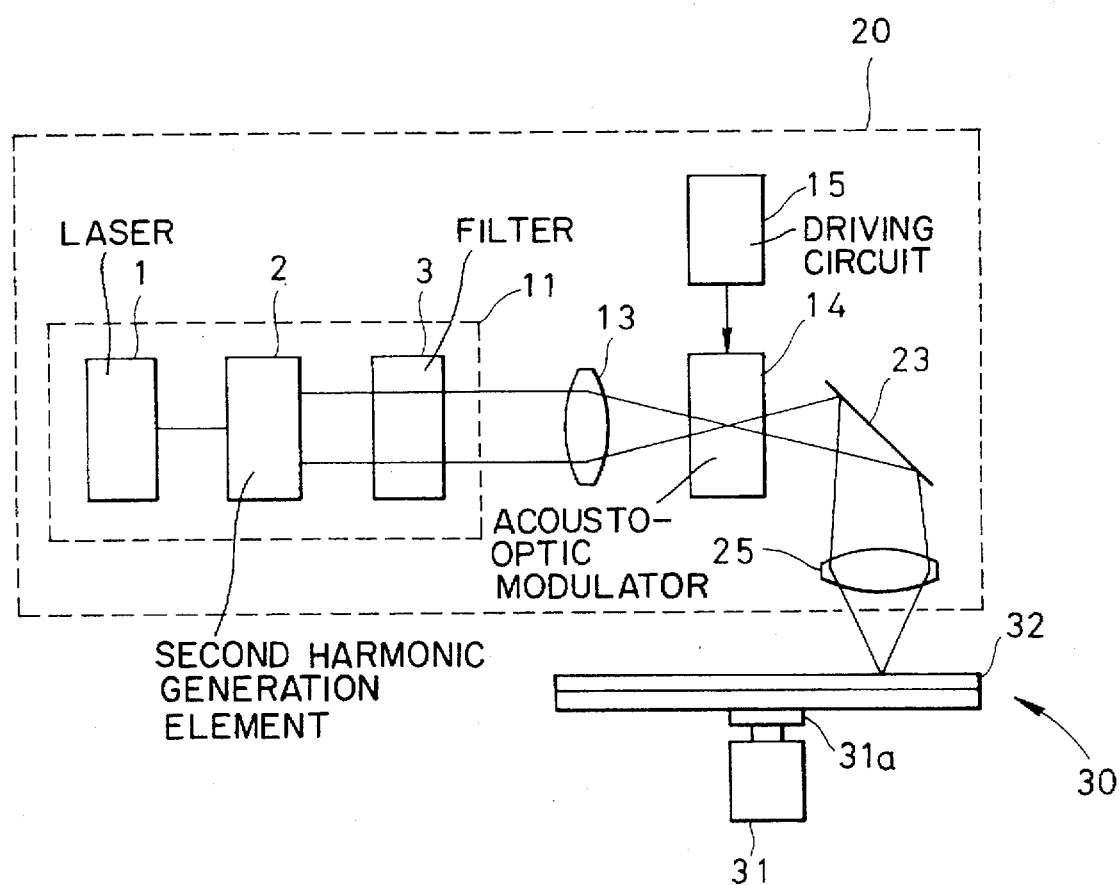
FIG. 2 is a block diagram showing a first embodiment of the invention.

FIG. 2 shows a first embodiment of the present invention.

The same reference numerals are assigned to the counterparts in the conventional apparatus shown in FIG. 1.

A master optical disk recording apparatus according to the present invention comprises a moving optical system 20 and a drive motor 31 which rotates a master optical disk 30 at a specific rotational speed.

A source of laser light 11 included in the moving optical system 20 may consists of a semiconductor laser 1 and an optical resonance type SHG (second harmonic generation) element 2. A laser beam emitted from the semiconductor laser 1 with wavelengths of 840 nm is converted into a second harmonic beam with wavelengths of 420 nm by the SHG element 2. The collimated beam emerged from the optical resonance type SHG element 2 passes through a filter 3 and is converged by a convergence lens 13. At the convergence point is positioned a modulation element in an acousto-optic modulator 14. A drive voltage for an ultra-sonic wave carrying thereon a signal to be recorded is supplied from an acousto-optic drive circuit 15 to the modulation element in the acousto-optic modulator 14 so that the acousto-optic modulator 14 modulates the laser beam. The modulated laser beam by the acousto-optic modulator 14 is the laser beam which is controlled in its intensity at time intervals by the modulating signal. The modulated laser beam is reflected by a mirror 23, and is converged to have an optimized diameter by an objective lens 25 which is a finite conjugate type lens, whereby the converged beam is irradiated onto a photoresist layer on a glass substrate of the master optical disk 30. The finite conjugate type objective lens 25 functions converting even a diverging incident light beam into a converging outgoing light beam. It is now to be noted that the point where the laser beam is converged by the convergence lens 13 is positioned outside of the focal point of the objective lens 25 at the incidence side thereof.

The source of laser light 11, the convergence lens 13, the acousto-optic modulator 14, the reflector 23 and the objective lens 25 are all mounted on an optical bench (not shown). The optical bench has means for moving itself along a radial direction of the master optical disk 30. While the optical bench moves a specific length from the position corresponding to the inner radius in the recording zone on the master optical disk 30 to the position corresponding to the periphery of the disk 30, the modulated and converged laser beam is irradiated onto the master optical disk 30. The photoresist layer 32 of master optical disk 30 is exposed by the irradiation. A train of pits respectively having lengths corresponding to the time intervals of variations in the beam intensity are formed on the optical master disk 30 by developing the master optical disk 30 having been exposed.

After the surface of the master optical disk 30 is plated with nickel, the nickel plated layer is removed from the master optical disk 30 to form a nickel stamper which is used for forming optical disks which might be introduced to the market.

Figure 3:
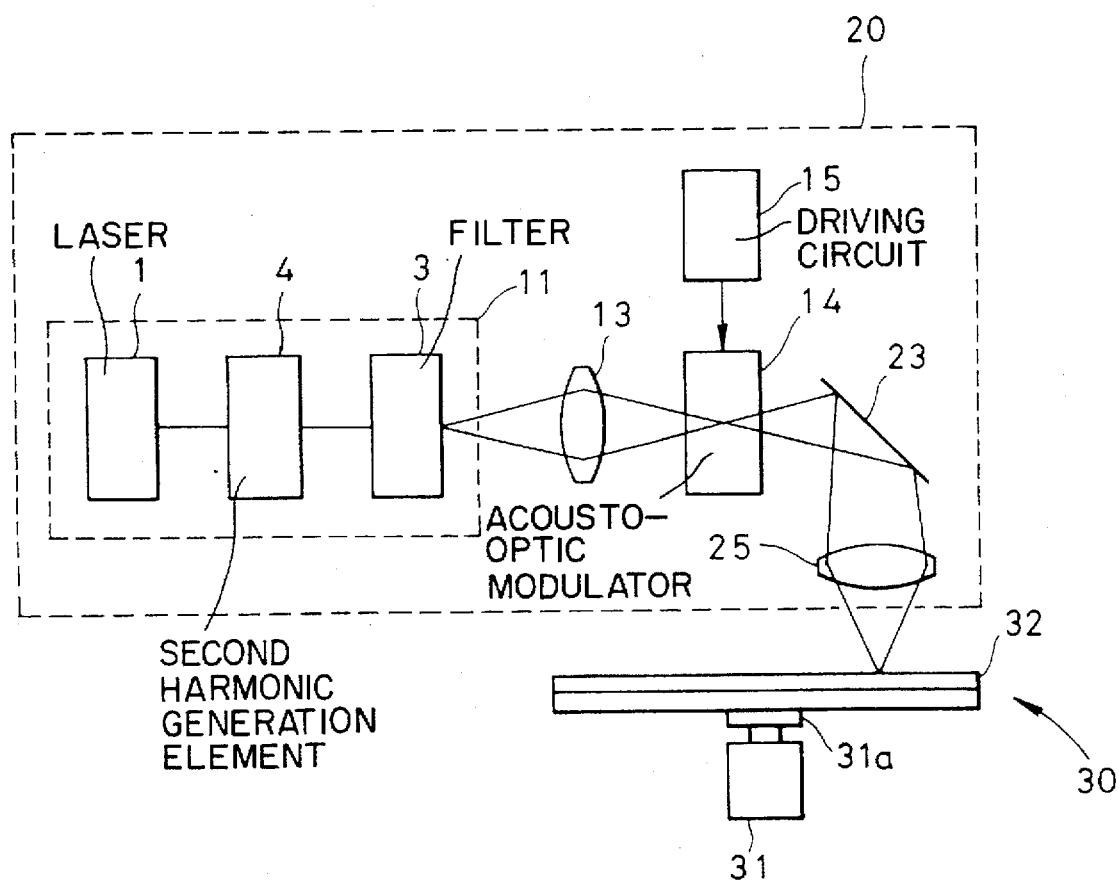
FIG. 3 is a block diagram showing a second embodiment of the invention.

FIG. 3 shows a second embodiment of the present invention. As in the first embodiment, the same reference numerals are assigned to the counterparts of the conventional apparatus shown in FIG. 1.

In a laser light source 11, a laser beam emitted from the semiconductor laser 1 with wavelengths of 840 nm is converted into a second harmonic beam with wavelengths of 420 nm by an optical waveguide type SHG element 4. The divergent beam emerging from the optical waveguide type SHG element 4 passes through the filter 3, is converged by the convergence lens 13 and is modulated by the acousto-optic modulator 14. The modulated beam is reflected by a mirror 23 and is converged by a finite conjugate type objective lens 25. The acousto-optic modulator 14 is positioned at a point where the laser beam emerging from the convergence lens 13 is converged. The converged position is positioned outside of the focal point of the objective lens 25 at the incident side thereof.

Since constructions and operations other than those mentioned above in the second embodiment are the same as in the first embodiment, the explanation is omitted.

The two embodiments above-mentioned are explained in the case of using the semiconductor laser with wavelengths of 840 nm as the source of laser light, and a blue semiconductor laser with wavelengths of 420 nm may be used as a source of laser light, and the essence of the present invention is not altered by the wavelength of the laser beam.

In the embodiments mentioned above, a master optical disk recording apparatus is constructed in such a manner that the optical system is movable. However, the recording apparatus might be so modified that the optical system is fixed and means for rotating the master optical disk is movable.

Since the master optical disk recording apparatus according to the invention, the convergence point of the lens 13 is positioned outside of the focal point of the finite conjugate type objective lens 25 at the incident side thereof, the optical path length from the source of laser light 11 to the objective lens 25 can be shortened more than the conventional one and the optical system as a whole can be reduced in size and simplified in construction, and it is possible to avoid adverse influence caused by possible movements of the optical axis.

What is claimed is:

1. A master optical disk recording apparatus, comprising:

a laser light source; rotating means for rotating a master optical disk to record an information signal; an acousto-optic modular which modulates an incident beam thereinto in response to the information signal; a convergence lens system which converges a laser beam emitted from said laser light source to said acousto-optic modulator; an objective lens which converges the modulated laser beam emitted from said acousto-optic modulator and which irradiates the master optical disk with the modulated laser beam; a support on which said laser light source, said acousto-optic modulator and said objective lens are mounted; and means for moving said support relative to said rotating means, wherein said laser light source includes a semiconductor laser element, wherein said objective lens is finite conjugate, and wherein said convergence lens system converges the laser beam from said laser light source to a convergence point positioned outside of the focal point in the incident side of said objective lens, said acousto-optic modulator being positioned at said convergence point.

2. The master optical disk recording apparatus according to claim 1, in which the laser light source further includes:

means for converting a laser beam emitted from said semiconductor laser element to a laser beam with a shorter wavelength than said laser beam emitted from said semiconductor laser element.

* * * * *